Aug. 7, 1956

L. A. MEDLAR 2,758,275

BATTERY TESTING APPARATUS

Filed Dec. 12, 1952

INVENTOR:
Lewis A Medlar
BY
Stone, Boyden & Mack,
ATTY'S

United States Patent Office 2,758,275
Patented Aug. 7, 1956

2,758,275

BATTERY TESTING APPARATUS

Lewis A. Medlar, Oreland, Pa., assignor to Fox Products Company, Philadelphia, Pa., a corporation of Pennsylvania Application December 12, 1952, Serial No. 325,672

5 Claims. (Cl. 324—29.5)

This invention relates to battery testing apparatus and particularly to an improved apparatus for testing multi-cell storage batteries by cell comparison.

As shown in co-pending applications, Ser. No. 325,660, now Patent No. 2,675,522, dated April 13, 1954, and Ser. No. 325,661, filed of even date herewith by James B. Godshalk, now Patent No. 2,689,939, dated September 21, 1954, it has been proposed to test multi-cell storage batteries with apparatus including a first circuit connectable either across the entire battery to be tested or across a single cell thereof, and a second circuit including means such as a twin-pronged hand prod which may be selectively connected across any desired individual cell of the battery. Such devices employ a differential electromagnetic indicating device, such as a differential voltmeter, having one operating coil connected in each of the circuits mentioned. While such an apparatus is highly advantageous, the use of a differential electromagnetic device makes the cost of the apparatus excessive for some purposes.

An object of the present invention is to provide a battery testing apparatus of the type referred to employing a simple voltmeter as the indicating means.

A further object of the invention is to provide a relatively simple and particularly inexpensive battery testing apparatus for testing multi-cell storage batteries by cell comparison.

Yet another object of the invention is to provide such an apparatus capable of testing multi-cell storage batteries having any number of cells.

In order that these and other objects of the invention may be understood in detail, reference is had to the accompanying drawings which form a part of this specification and wherein.

The invention may be employed either to compare the actual cell voltages of the battery with the average cell voltage of the battery, or to compare the actual cell voltages one with another. In general, the apparatus comprises a first circuit connectable to the battery to derive a first potential, a second circuit including a source of direct current separate from the battery and adjustable means for providing a second potential equal to said first potential, a third circuit including means such as a twin-pronged hand prod for selectively connecting the same across any desired individual cell of the battery, a voltmeter, and means for selectively connecting the voltmeter to indicate either the difference between said first and second potentials or the difference between said second potential and the potential of the cell to which said third circuit is connected.

Figure 1:
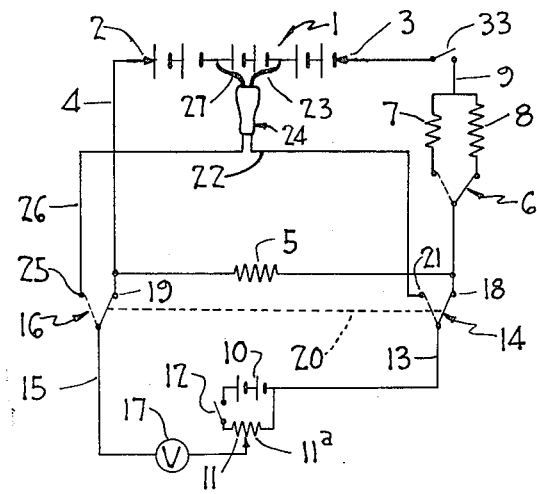
Fig. 1 is a schematic diagram illustrating one embodiment of the invention adapted for testing multi-cell storage batteries by comparing the actual voltage of each cell of the battery with the average voltage of all of the cells.

Referring now to the drawings in detail, Fig. 1 shows an embodiment of the invention adapted to test batteries in accordance with the method disclosed by James B. Godshalk in the aforementioned co-pending application Ser. No. 325,660, now Patent No. 2,675,522, dated April 13, 1954. This embodiment includes a first circuit connectable across the entire battery 1 to be tested, as by means of terminal connector clamps 2 and 3, said first circuit comprising conductor 4, resistance 5, selector switch 6, one of the two resistances 7 and 8 selected by operation of the switch 6, and conductor 9. The resistances 7 and 8 are intended to be selectively included in the first circuit, the selection being made in accordance with the voltage rating of the battery to be tested. Thus, a larger resistance 8 may be selected when a 12-volt battery, for example, is being tested and a smaller resistance 7, when a 6-volt battery is to be tested. The values of the resistances 5, 7 and 8 are so proportioned that the potential difference across resistance 5, when said first circuit is connected across the battery, will be equal to the average cell voltage of the battery. Thus, the resistance 7 may have a value twice that of 5 and the resistance 8 may have a value five times that of resistance 5, where 3-cell and 6-cell batteries, respectively, are to be tested.

I provide a source of direct current 10 separate from the battery 1. Conveniently, such current source may be one or more primary batteries. A potentiometer 11 has its end terminals connected across the direct current source 10 through a switch 12, as shown. One side of the combination of current source 10 and potentiometer 11 is connected by conductor 13 to the movable contact of a selector switch 14. The adjustable contact of the potentiometer 11 is connected via conductor 15 to the movable contact of a selector switch 16. A voltmeter 17 is connected in series in conductor 15. One stationary contact 18 of switch 14 is connected to the junction between resistance 5 and switch 6. Similarly, one stationary contact 19 of switch 16 is connected to the junction between resistance 5 and terminal connector 2. The movable contacts of switches 14 and 16 are arranged for operation by means of a common operator, indicated by dotted line 20, so that the movable contact of switch 14 engages stationary contact 18 whenever the movable contact of switch 16 engages stationary contact 19.

There exists between the adjustable contact of potentiometer 11 and the side of the current source 10 connected to switch 14, a potential difference, the magnitude of which is determined by adjustment of the potentiometer. It will be noted that the direct current source 10 is so connected that this potential difference will be in opposition to the potential difference across resistance 5, that is, the negative side of the current source 10 is connected to the side of resistance 5 which is the more negative. Current source 10 is so selected that the potential difference between the adjustable contact of the potentiometer 11 and the side of current source 10 connected to the switch 14 may be made by adjustment of the potentiometer at least equal to the maximum average cell voltage which will be encountered during use of the apparatus. It is thus seen that a potential difference is derived from the current source 10 which may be made equal to the potential difference across resistance 5, the two potential differences being in opposition. Any difference between the two potential differences will of course be indicated by the voltmeter 17.

The remaining stationary contact 21 of switch 14 is connected via conductor 22 to contact prong 23 of a twin-pronged hand prod 24. Similarly, the remaining stationary contact 25 of switch 16 is connected via conductor 26 to contact prong 27 of the prod 24. Thus, when the movable contacts of switches 14 and 16 are thrown into engagement with contacts 21 and 25, respectively, the series combination of portion 11a of the potentiometer 11 and voltmeter 17 is connected across the contact prongs 23 and 27 of prod 24, and therefore across any cell of the battery to which the prod 24 is connected. Accordingly, if the prod 24 is connected with proper polarity, the actual voltage of the cell to which it is connected will be opposed to the potential difference across portion 11a of the potentiometer 11 and any difference between the actual voltage of that cell and the potential difference across portion 11a of the potentiometer will appear as a net voltage operating the voltmeter 17.

Figure 2:
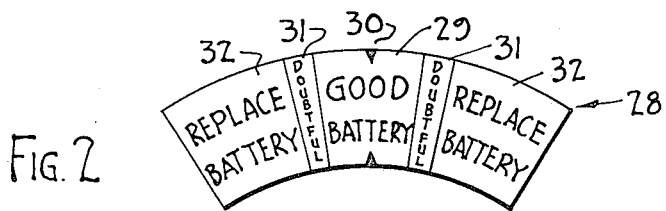
Fig. 2 is a plan view of one form of meter dial useful in the device of Fig. 1.

In operation, connectors 2 and 3 are connected to the terminals of the battery to be tested. Selector switch 6 is then operated to include in the circuit one of the resistances 7 and 8, depending upon the voltage rating of the battery to be tested. With the movable contacts of switches 14 and 16 in engagement with contacts 18 and 19, respectively, the operator then adjusts the potentiometer 11 until voltmeter 17 reads zero. Switches 14 and 16 are then actuated to the opposite position. The operator then connects hand prod 24 across each cell of the battery in sequence, noting the reading of voltmeter 17 for each connection. As fully described in the aforementioned co-pending applications, a pre-determined difference between the actual cell voltages of a storage battery will indicate that the battery is faulty. This pre-determined difference may be in the range of .04–.06 volt for a conventional automotive storage battery on "open circuit" test. Similarly, a pre-determined misalignment between the actual cell voltages and the average cell voltage of the battery will indicate that the battery is faulty. Therefore, the meter 17 may be provided with a suitable scale calibrated in accordance with such pre-determined difference. For example, as seen in Fig. 2, the scale 28 may be provided with a central "good battery" range 29 and zero point 30, the extent of the portion 29 of the scale being determined in accordance with the magnitude of the pre-determined voltage difference taken as indicating a faulty battery. The "good battery" range 29 may be bordered by "doubtful" ranges 31, and the scale may terminate at each end in "replace battery" ranges 32. In use, the indicating needle of the meter 17 is brought to the zero point 30 by adjustment of the potentiometer 11 during the first phase of the test. Then, as the operator carries out the second phase of the test, connecting the prod 24 across each cell of the battery, he need only observe whether the voltmeter needle indicates in the "good battery," "doubtful," or "replace battery" range of the scale.

As previously stated, it is convenient to use as the current source 10 one or more primary batteries, and these may be left connected to the apparatus continually. So that current will not flow through the potentiometer 11 when the device is not in use, I provide the manual on-off switch 12. Similarly, I may include a manual switch 33, Fig. 1, in series with the resistance 5, and the switches 12 and 33 may be arranged for actuation by a common manual operating member.

Figure 3:
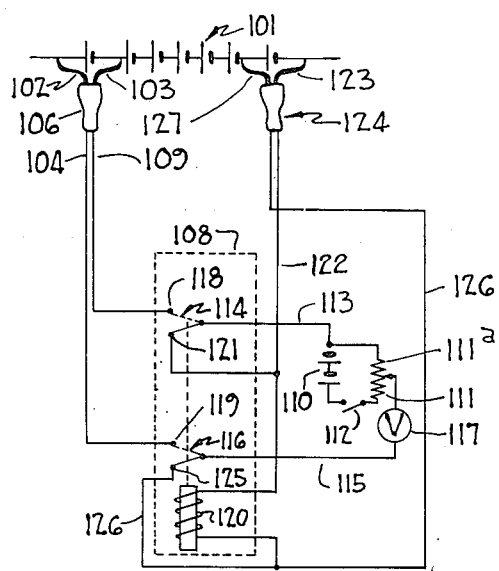
Fig. 3 is a schematic diagram of another embodiment of the invention adapted to test batteries by comparing the actual voltage of one cell thereof with the actual voltages of each of the other cells.

Fig. 3 illustrates an embodiment of the invention adapted for testing storage batteries by comparing the actual voltages of the cells. The device includes a first circuit comprising a twin-pronged hand prod 106 having its contact prong 102 connected via conductor 104 to stationary contact 119 of contact set 116, of a double pole double throw relay 108. Contact prong 103 of the prod 106 is similarly connected via conductor 109 to stationary contact 118 of contact set 114 of the relay. The device includes a second circuit comprising a source of direct current 110, a switch 112 of function similar to that of switch 12 of Fig. 1, and a potentiometer 111. One side of the combination of current source 110 and potentiometer 111 is connected via conductor 115 to the movable contact of contact set 116 of the relay. Stationary contact 121 of contact set 114 is connected via conductor 122 to contact prong 123 of a twin-pronged hand prod 124. Similarly, the stationary contact 125 of contact set 116 is connected via conductor 126 to contact prong 127 of the prod 124. A voltmeter 117 is connected in conductor 115.

Thus, when the relay contacts are in the positions shown in solid lines in Fig. 3, the series combination of voltmeter 117 and portion 111a of the potentiometer 111 is connected across the contact prongs 123 and 127 of prod 124. Assuming that the prod 124 is connected in proper polarity, the potential difference across the portion 111a of the potentiometer will then be in opposition to the voltage of the cell across which prod 124 is connected, and voltmeter 117 will indicate any difference between the voltage of that cell and the potential difference across potentiometer portion 111a. Similarly, if the contact positions of the relay are reversed, the series combination of voltmeter 117 and portion 111a of the potentiometer will be connected across the contact prongs of prod 106. Then, assuming that prod 106 has been connected with proper polarity, the potential difference across portion 111a of the potentiometer will be opposed to the voltage of the cell across which prod 106 is connected and the voltmeter 117 will indicate any difference between the voltage of that cell and the potential difference across portion 111a of the potentiometer.

Relay 108 is so arranged that when the relay is relaxed, the movable contacts will engage stationary contacts 118 and 119, but, when the relay is energized, the movable contacts will engage stationary contacts 121 and 125. Actuating winding 120 of relay 108 is connected between conductors 122 and 126 so that the relay is energized whenever prod 124 is connected to a cell of the battery.

In operation, prod 106 is first connected across an end cell of the battery 101 to be tested, prod 124 being left disconnected from the battery. The operator then adjusts potentiometer 111 until voltmeter 117 reads zero. With prod 106 still connected, the operator then connects prod 124 across each cell of the battery, other than the cell to which prod 106 is connected, in sequence. As soon as prod 124 is connected to a cell, winding 120 of relay 108 is energized to connect voltmeter 117 to indicate any difference between the voltage of the cell to which prod 124 is connected and the potential difference across portion 111a of the potentiometer. In the first step of the test, the potential difference across portion 111a was made equal to the voltage of the end cell of the battery 101 across which prod 106 is connected. Accordingly, to complete the test, the operator need only observe meter 117 for each connection of prod 124 to determine if the meter gives a pre-determined voltage reading. The meter 117 may be provided with a scale such as scale 28, Fig. 2, so that it will be unnecessary for the oeprator to read the meter, in terms of volts. Whenever the operator disconnects prod 124 from a cell of the battery, relay 108 will relax, again connecting voltmeter 117 to indicate any difference between the voltage of the end cell to which prod 106 is connected and the potential difference across portion 111a of the potentiometer. Thus, the operator may continually observe the voltmeter to determine whether or not it is necessary to re-adjust the potentiometer during the test.

While I have shown contacts 102 and 103 as the prongs of a hand prod, it will be clear that other types of connecting devices may be employed when desired. Similarly, it will be clear that a relay such as relay 108 of Fig. 3 may be substituted for the switches 14 and 16 of Fig. 1.

So that the potential difference across the portion 11a, Fig. 1, or 111a, Fig. 3, of the potentiometer will not be materially varied because of the current flowing through the voltmeter when the two potentials to which it is connected differ, the resistance of the voltmeter is made markedly higher than the resistance of the potentiometer. For example, the resistance of the voltmeter may be on the order of 10 times that of the potentiometer. Also, the resistance of the voltmeter must be relatively high, as compared to that of relay winding 120, Fig. 3, in order to prevent the relay from being energized from the current source 110 once that winding has been energized as a result of connection of prod 124 to a cell of battery 101.

I claim:

1. In a device for testing multi-cell storage batteries by cell comparison, the combination of a first circuit connectable to the battery to be tested to derive a first potential therefrom, a second circuit including a source of direct current separate from the battery to be treated and adjustable means for deriving from said source of current a second potential, a third circuit including means for selectively connecting the same across any individual cell of the battery to be tested, a voltmeter, and means for selectively connecting said voltmeter to indicate the difference between either said second and first potentials or said second potential and the voltage of the cell to which said third circuit is connected.

2. In a device for testing by cell comparison multi-cell storage batteries of a given normal voltage, the combination of a first circuit connectable across the entire battery to be tested and including means for discharging the battery to produce a first potential equal to the average cell voltage of the battery, a second circuit including a source of direct current separate from the battery and adjustable means for deriving from said source of current a second potential, a third circuit including means for selectively connecting the same across any individual cell of the battery to be tested, a voltmeter, and means for selectively connecting said voltmeter to indicate the difference between either said second and first potentials or said second potential and the voltage of the cell to which said third circuit is connected.

3. In a device for testing by cell comparison multi-cell storage batteries of a given normal voltage, the combination of a first circuit connectable across the entire battery to be tested and including two resistances in series, the values of said resistances being so proportioned that the potential difference across one of said resistances is equal to the average cell voltage of the battery when said first circuit is connected thereacross, a second circuit including means for connecting the same selectively across any desired individual cell of the battery, a potentiometer, means for connecting the end terminals of the potentiometer across a source of direct current separate from the battery to be tested, a voltmeter, and means for selectively connecting the series combination of said voltmeter and a portion of the potentiometer determined by adjustment thereof across either said one resistance or said second circuit.

4. In a device for testing by cell comparison multi-cell storage batteries of a given normal voltage, the combination of a first circuit connectable across the entire battery to be tested and including two resistances connected in series, the values of said resistances being so proportioned that the potential difference across one of said resistances is equal to the average cell voltage of the battery when said first circuit is connected thereacross, a second circuit including a twin-pronged hand prod for connecting the same selectively across any desired individual cell of the battery, a potentiometer, a battery other than that to be tested, means connecting the end terminals of said potentiometer across said other battery, a voltmeter, and means for selectively connecting the series combination of said voltmeter and a portion of said potentiometer determined by adjustment thereof across either said one resistance or said second circuit.

5. In an apparatus for testing multi-cell storage batteries by cell comparison, the combination of a first circuit connectable to the battery to derive a first potential difference therefrom, a second circuit including a source of direct current separate from the battery to be tested and adjustable means for deriving a second potential difference from said source, a third circuit including means for selectively connecting the same across any desired individual cell of the battery, a voltmeter, and means including a relay for connecting said voltmeter to indicate either the difference between said second and first potential differences, when said relay is in one position, and the difference between said second potential difference and the voltage of the cell to which said third circuit is connected, when the relay is in the other position, the actuating winding of said relay being connected across one of said first and third circuits.

References Cited in the file of this patent

UNITED STATES PATENTS

| | | |
|---|---|---|
| 2,225,051 | Heyer | Dec. 17, 1940 |
| 2,229,009 | Berry | Jan. 14, 1941 |
| 2,560,857 | Gambetta | July 17, 1951 |
| 2,675,522 | Godshalk | Apr. 13, 1954 |